US009473655B2

(12) United States Patent
Matsui

(10) Patent No.: US 9,473,655 B2
(45) Date of Patent: Oct. 18, 2016

(54) IMAGE READING DEVICE FOR CONTROLLING INTENSITY OF LIGHT APPLIED TO IMAGE READING SECTION IN DETECTING SIZE OF ORIGINAL DOCUMENT TO BE READ, AND IMAGE FORMING APPARATUS INCLUDING THE SAME

(71) Applicant: KYOCERA Document Solutions Inc., Osaka (JP)

(72) Inventor: Shinya Matsui, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/938,339

(22) Filed: Nov. 11, 2015

(65) Prior Publication Data

US 2016/0150109 A1 May 26, 2016

(30) Foreign Application Priority Data

Nov. 25, 2014 (JP) ................................. 2014-238115

(51) Int. Cl.
*H04N 1/00* (2006.01)
*H04N 1/10* (2006.01)

(52) U.S. Cl.
CPC ........ *H04N 1/00708* (2013.01); *H04N 1/0075* (2013.01); *H04N 1/00551* (2013.01); *H04N 1/00737* (2013.01); *H04N 1/10* (2013.01); *H04N 2201/0094* (2013.01)

(58) Field of Classification Search
None
See application file for complete search history.

(56) References Cited

U.S. PATENT DOCUMENTS

| 2006/0193013 A1* | 8/2006 | Hoshi | H04N 1/00708 358/474 |
| 2007/0201105 A1* | 8/2007 | Shoda | H04N 1/4095 358/449 |
| 2008/0094668 A1* | 4/2008 | Matsui | H04N 1/00681 358/449 |
| 2009/0073480 A1* | 3/2009 | Yanagawase | G03B 27/6221 358/1.13 |
| 2010/0067065 A1* | 3/2010 | Ishido | H04N 1/00681 358/449 |
| 2010/0245942 A1* | 9/2010 | Shimatani | H04N 1/00002 358/475 |
| 2010/0296135 A1* | 11/2010 | Tanaka | H04N 1/00708 358/475 |
| 2011/0085214 A1* | 4/2011 | Shinkawa | H04N 1/00002 358/475 |
| 2014/0085685 A1* | 3/2014 | Nanbu | H04N 1/00755 358/449 |
| 2015/0286906 A1* | 10/2015 | Murakami | H04N 1/393 358/1.2 |

FOREIGN PATENT DOCUMENTS

JP 2003-255477 A 9/2003

* cited by examiner

*Primary Examiner* — Ming Hon
(74) *Attorney, Agent, or Firm* — IP Business Solutions, LLC

(57) ABSTRACT

An image reading device includes: an image reading section configured to read an image of an original document; a document size detecting section configured to use image data acquired by the image reading section with an original cover open to detect a size of the original document in a main scanning direction; and a control section configured to allow the document size detecting section to perform a detection of the size of the original document by lighting a light source of the image reading section at an initial light intensity, subsequently allow the document size detecting section to perform another detection of the size of the original document by lighting the light source at a reduced light intensity, and set, when the same size has been detected in the two detections of the size of the original document, the reduced intensity as a document size detection light intensity.

4 Claims, 7 Drawing Sheets

LIGHT INTENSITY A: LIGHTING OF 1/3 OF ALL LEDS

LIGHT INTENSITY B: LIGHTING OF 1/2 OF ALL LEDS

LIGHT INTENSITY C: LIGHTING OF ALL LEDS

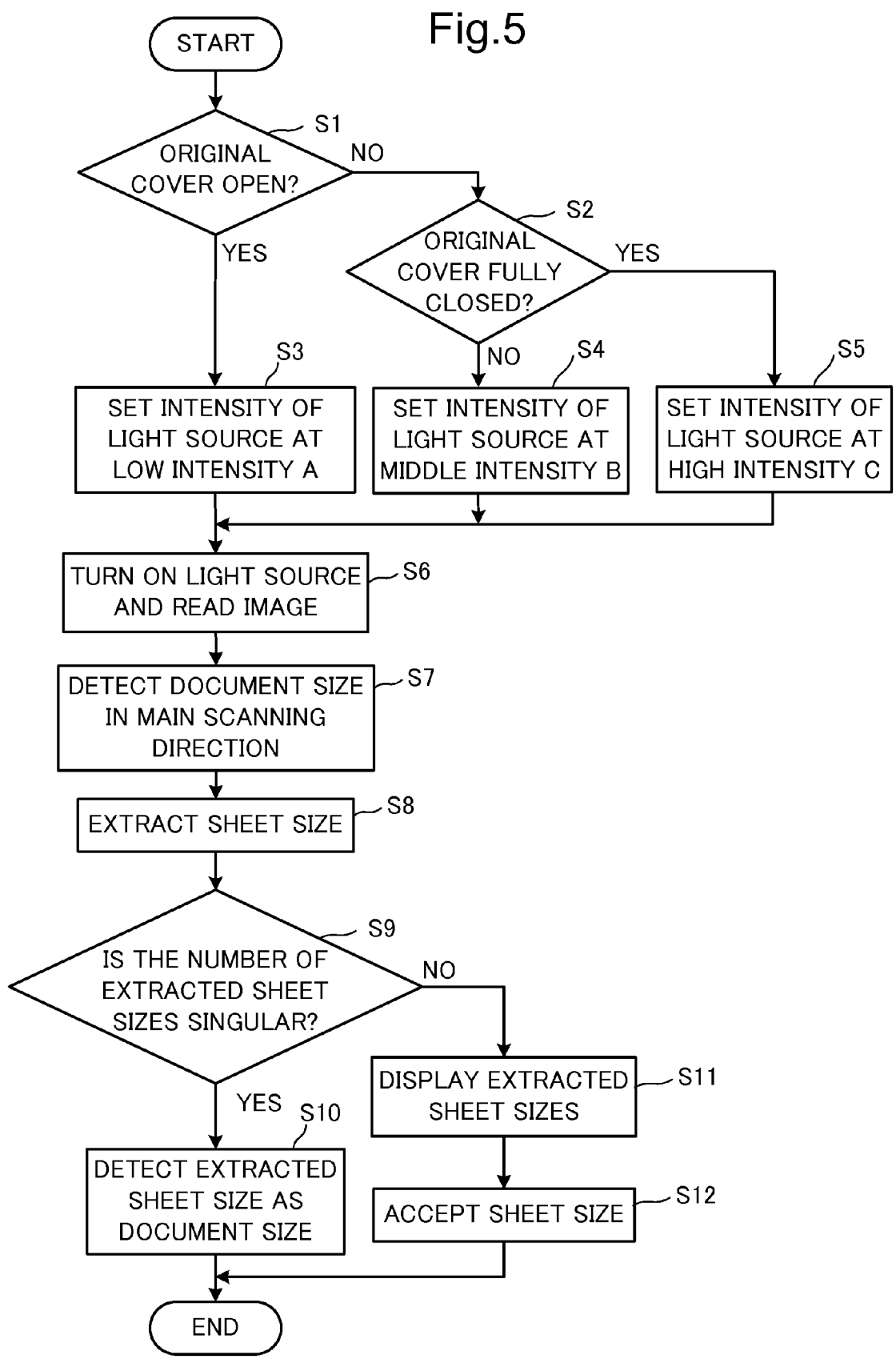

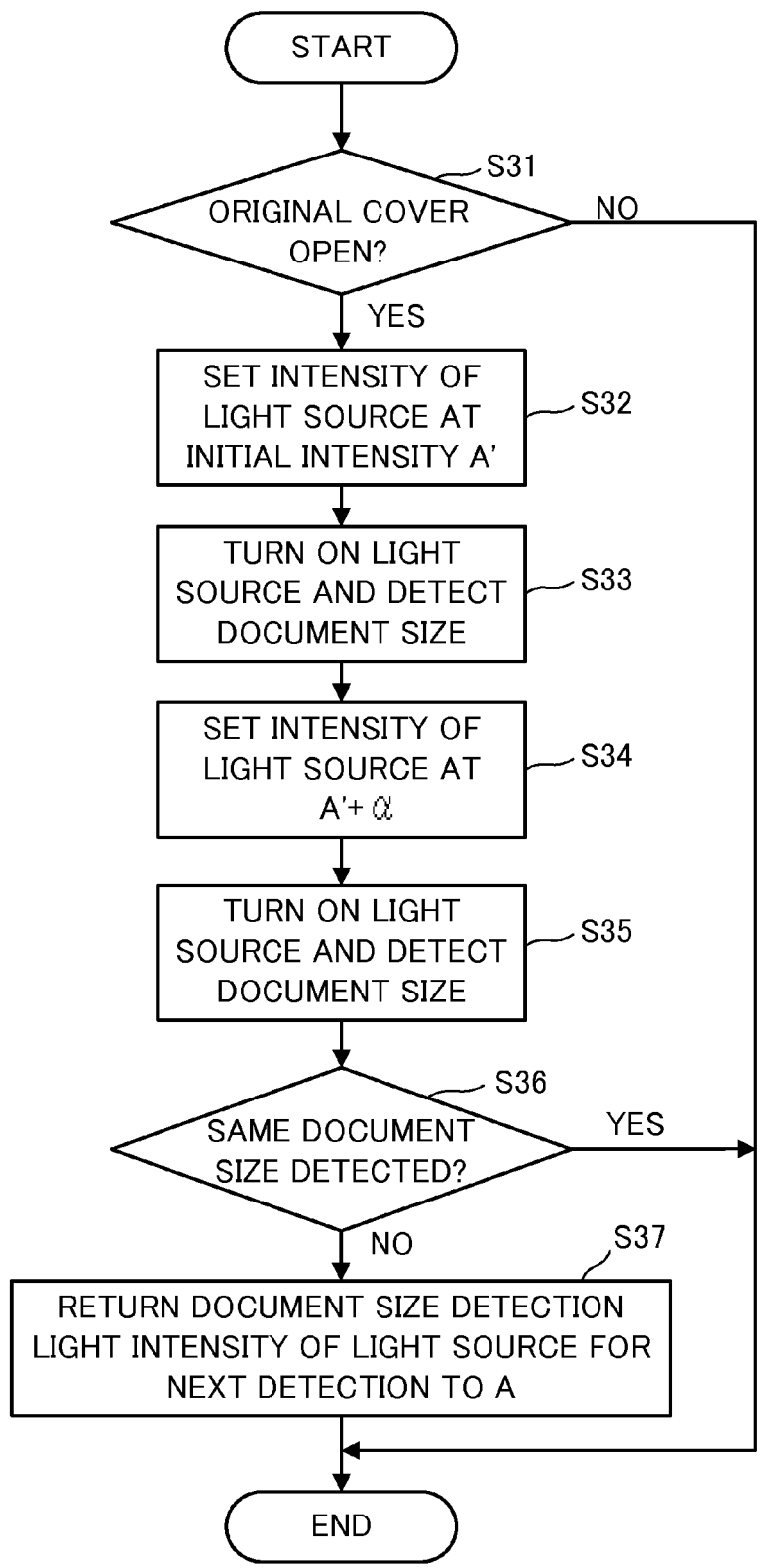

IMAGE READING DEVICE FOR CONTROLLING INTENSITY OF LIGHT APPLIED TO IMAGE READING SECTION IN DETECTING SIZE OF ORIGINAL DOCUMENT TO BE READ, AND IMAGE FORMING APPARATUS INCLUDING THE SAME

INCORPORATION BY REFERENCE

This application claims priority to Japanese Patent Application No. 2014-238115 filed on Nov. 25, 2014, the entire contents of which are incorporated by reference herein.

BACKGROUND

The present disclosure relates to image reading devices and image forming apparatuses and particularly relates to a technique for controlling the intensity of light applied to an image reading section in detecting the size of an original document to be read.

Image forming apparatuses, such as multifunction peripherals, are equipped with an image reading device operable to optically read an original document placed on an original glass plate to generate image data. Among such image reading devices are those configured to detect the size of an original document on the original glass plate immediately before an original cover is closed.

The detection of the size of an original document is performed by irradiating the original document with light from under the original glass plate with the original cover open and reading the reflected light. Since during the detection of the size of the original document light is applied to the original document from under the original glass plate with the original cover open, intensive light through the original glass plate is directed to the operator. To cope with this, a technique is proposed of making the light intensity during the detection of the size of an original document with the original cover open smaller than the light intensity during image reading to keep intensive light from entering the operator's eyes during the detection of the size of the original document.

SUMMARY

A technique improved over the aforementioned technique is proposed as one aspect of the present disclosure.

An image reading device according to an aspect of the present disclosure includes an original glass plate, an original cover, an image reading section, a document size detecting section, and a control section.

The original glass plate is used with an original document placed on a top surface thereof.

The original cover is pivotally mounted at one edge thereof and capable of surface contact with the original glass plate.

The image reading section is configured to read the original document to acquire image data of the original document and includes a light source capable of irradiating the original document with light from under the original glass plate, an optical system configured to form an optical image of reflected light from the original document irradiated by the light from the light source, and an image sensor configured to convert the optical image formed by the optical system into an electrical signal.

The document size detecting section is configured to use the image data acquired by the image reading section with the original cover open to detect a size of the original document in a main scanning direction of the image reading section.

The control section is configured to allow the document size detecting section to perform a detection of the size of the original document by lighting the light source at an initial light intensity, subsequently allow the document size detecting section to perform another detection of the size of the original document by lighting the light source at a light intensity reduced by a predetermined value from the initial light intensity, and set, when the same size has been detected in the two detections of the size of the original document, the reduced intensity as a document size detection light intensity at which the light source is to be lit in detecting the size of an original document next time.

An image forming apparatus according to another aspect of the present disclosure includes the above-described image reading device and an image forming section.

The image forming section is configured to form an image using the optical image of the original document read by the image reading device.

BRIEF DESCRIPTION OF THE DRAWINGS

FIG. 5 is a flowchart showing processing for setting the light intensity of a light source for use in detecting the size of an original document.

FIG. 7 is a flowchart showing processing for controlling the light intensity of the light source executed by the control section when detecting the size of an original document for the second and subsequent times.

DETAILED DESCRIPTION

Figure 1:
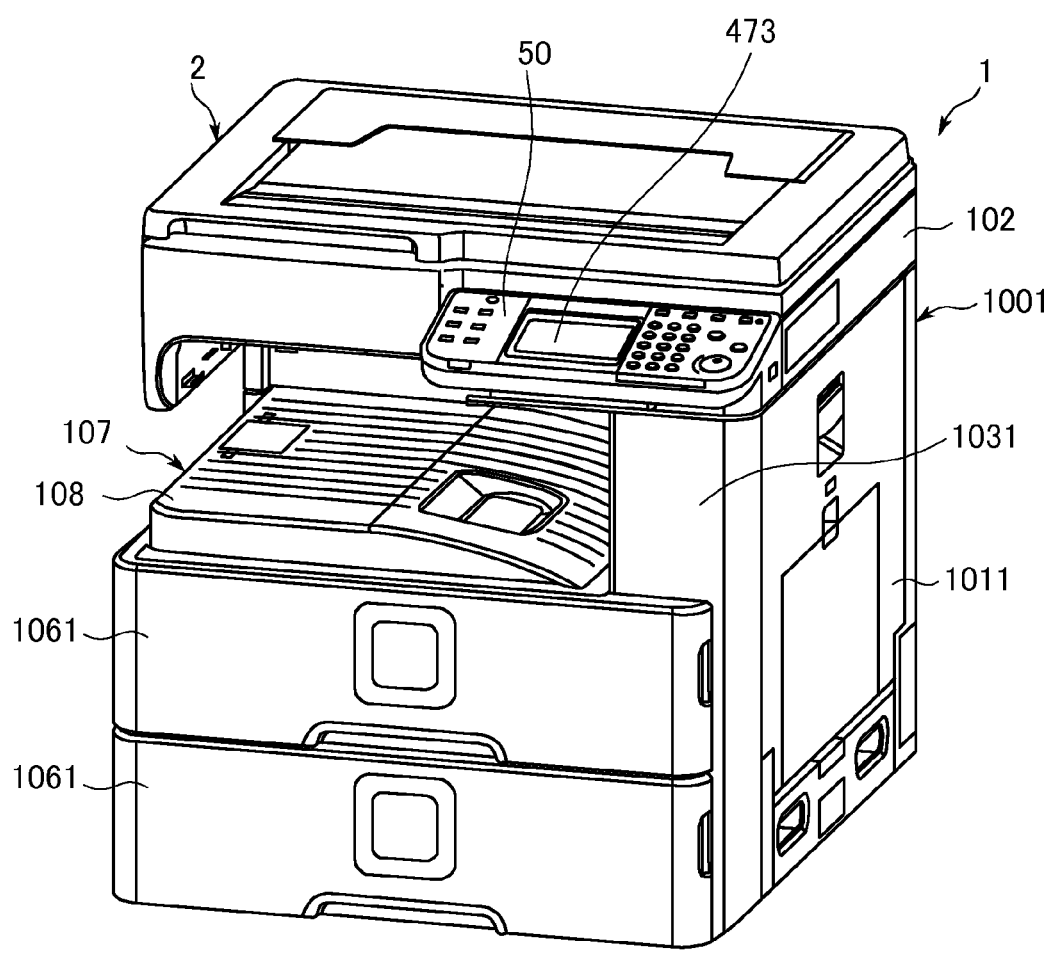
FIG. 1 is a perspective view showing the appearance of an image forming apparatus including an image reading device according to one embodiment of the present disclosure.

Hereinafter, a description will be given of an image forming apparatus and an image reading device both according to one embodiment of the present disclosure with reference to the drawings. FIG. 1 is a perspective view showing the appearance of the image forming apparatus including the image reading device according to the one embodiment of the present disclosure. The image forming apparatus 1 shown in FIG. 1 includes a housing 1001.

The housing 1001 includes a lower housing 1011, an upper housing 102 provided above the lower housing 1011, and a connecting housing 1031 connecting the lower and upper housings. A sheet stacking portion 107 is formed in an intermediate region between the lower housing 1011 and the upper housing 102 to hollow the intermediate region horizontally from one side. Furthermore, an operating section 50 is provided at the front of the upper housing 102. The operating section 50 is provided with a touch panel display 473. A sheet tray 108 is provided on the sheet stacking portion 107 so that sheets discharged from the lower housing 1011 are stacked thereon.

The upper housing 102 includes an image reading device 2 that is internally provided with a flatbed and configured to read an original document placed on the flatbed with a scanner section (an example of the image reading section) or the like. The lower housing 1011 contains an image forming mechanism including: a photosensitive drum, an exposure section, and a development section, which are configured to form a toner image on a sheet; and a fixing section configured to fix the toner image on the sheet. The lower housing 1011 further includes sheet feed cassettes (a sheet feed mechanism) 1061 capable of storing recording paper sheets. The connecting housing 1031 contains a sheet conveyance path along which a recording paper sheet having a toner image fixed thereon in the image forming process is conveyed and finally discharged to the sheet tray 108.

In the image forming apparatus 1, the image forming mechanism contained in the lower housing 1011 forms an optical image of an original document read by the image reading device 2 into a toner image on a recording paper sheet fed from one of the sheet feed cassettes 1061 and the recording paper sheet having the toner image formed thereon is discharged to the sheet tray 108 via the sheet conveyance path disposed in the connecting housing 1031.

Figure 2:
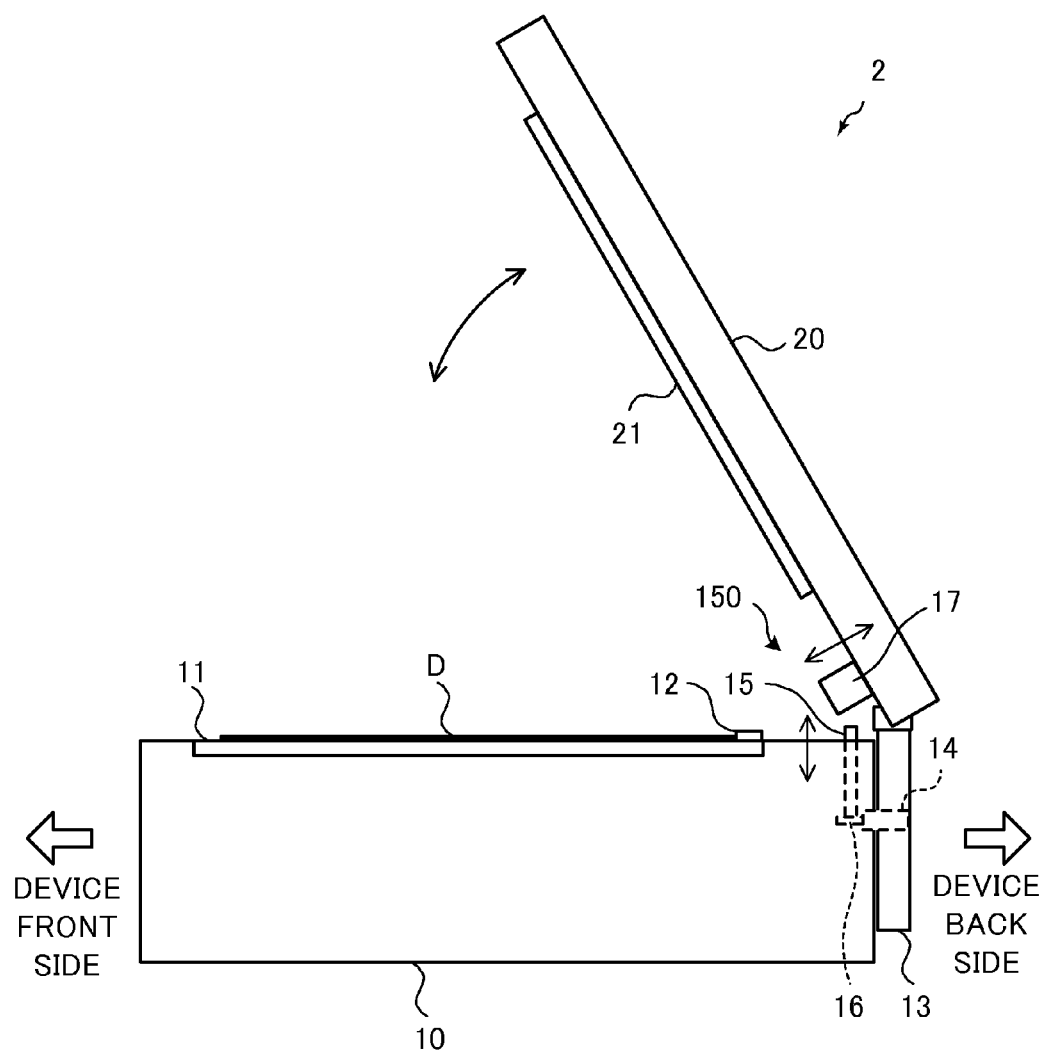
FIG. 2 is a schematic view showing the appearance and structure of the image reading device according to the one embodiment of the present disclosure.

FIG. 2 is a schematic view showing the appearance and structure of the image reading device 2 according to the one embodiment of the present disclosure. The image reading device 2 is a so-called optical reduction system image reading device configured to read an original document by forming an optical image of the original document on an image sensor, such as a CCD (charge coupled device), with an unshown optical lens. The image reading device 2 includes an image reading device body 10, an original glass plate (also referred to as a platen glass) 11 provided at the top of the image reading device body 10, a document size retaining member 12 provided on a device back side (depth side) of the top surface of the original glass plate 11, and an original cover (also referred to as a platen cover) 20 for use to hold down an original document D placed on the original glass plate 11.

The original cover 20 is an approximately flat member pivotally mounted with its device back side edge as a pivot axis to the image reading device body 10. Specifically, the original cover 20 is supported for openable and closable up-and-down movement by an original cover support portion 13 provided on the device back side of the image reading device body 10. The back surface of the original cover 20, i.e., the original document D side thereof, is provided with a white document mat 21 capable of surface contact with the original glass plate 11 and directly holding down the original document D. The document mat 21 is configured to, with the original cover 20 closed, uniformly hold the original document D against the original glass plate 11 to bring it into close contact with the original glass plate 11 and prevent disturbance light from entering the interior of the image reading device body 10 through the original glass plate 11 during image reading.

The original cover support portion 13 is provided with a sensor 14 for detecting whether the original cover 20 is open or closed. The sensor 14 constitutes an original cover open/close detection switch 150, together with a pressing member 17 and an auxiliary member 15 provided between the image reading device body 10 and the original cover support portion 13 to detect an open/closed position of the original cover 20.

The pressing member 17 is provided on the inside surface of the original cover 20 facing the original glass plate 11 and at a location where it can abut on the auxiliary member 15. The pressing member 17 is always pressed toward the auxiliary member 15 located below by, for example, an internally provided pressure spring and is extensible and retractable in the direction of the pressing.

The auxiliary member 15 is urged upward from the image reading device body 10. This urging force is smaller than the force of the pressure spring pressing the pressing member 17. When the original cover 20 is located away from the original glass plate 11 to form an angle of 30° (a predetermined angle) or more with the original glass plate 11, an upper end of the auxiliary member 15 does not make contact with the pressing member 17. In this state, the auxiliary member 15 is stationary at the uppermost position resulting from the urging.

On the other hand, when the original cover 20 is pivotally moved from the above position toward the original glass plate 11 and forms an angle smaller than 30° with the original glass plate 11, the auxiliary member 15 is depressed by the abutment on the pressing member 17. As seen from the above, the auxiliary member 15 is configured to move up and down in operative association with the opening/closing of the original cover 20.

The sensor 14 includes a light-emitting element and a light-receiving element both not given in the figure. When the original cover 20 is open at the predetermined angle or more and the auxiliary member 15 remains stationary at the uppermost position, a projection 16 formed at a lower end of the auxiliary member 15 is located between the light-emitting element and the light-receiving element of the sensor 14 to block the light between both the elements. Thus, the original cover 20 is detected to be in an "open position" by a control section 180 to be described hereinafter. On the other hand, when the original cover 20 is closed beyond the predetermined angle, the auxiliary member 15 starts being depressed and its projection 16 moves down, so that the light blockage between the light-emitting element and the light-receiving element of the sensor 14 is removed. At this time, the original cover 20 is detected to be in a "closed position" by the control section 180.

When the original cover 20 is further pivotally moved toward and come close to the original glass plate 11, the pressing member 17 depresses the auxiliary member 15 to the surface level of the original glass plate 11 and comes into contact with the original glass plate 11. At this time, by the contact with the original glass plate 11, the pressing member 17 is in turn depressed toward the original cover 20 against the pressure spring. When the original cover 20 is further pivotally moved so that its inside surface comes into close contact with the original glass plate 11, the pressing member 17 retracts by the above depression and is depressed to the level of the inside surface of the original cover 20. At this time, an unshown mechanical switch provided in the pressing member 17 turns from a previous switch open position to a switch closed position. When detecting the switch closed position, the control section 180 thus detects that the original cover 20 is in a "fully closed position" where it comes into close contact with the original glass plate 11 and is fully closed. When the switch is still at an open position, the control section 180 detects that the original cover 20 is in the "closed position" where it does not fully come into close contact with the original glass plate 11. In other words, the "closed position" refers to a position immediately before the original cover 20 is fully closed by close contact with the original glass plate 11 and where the original cover 20 is still open with respect to the original glass plate 11.

Figure 3:
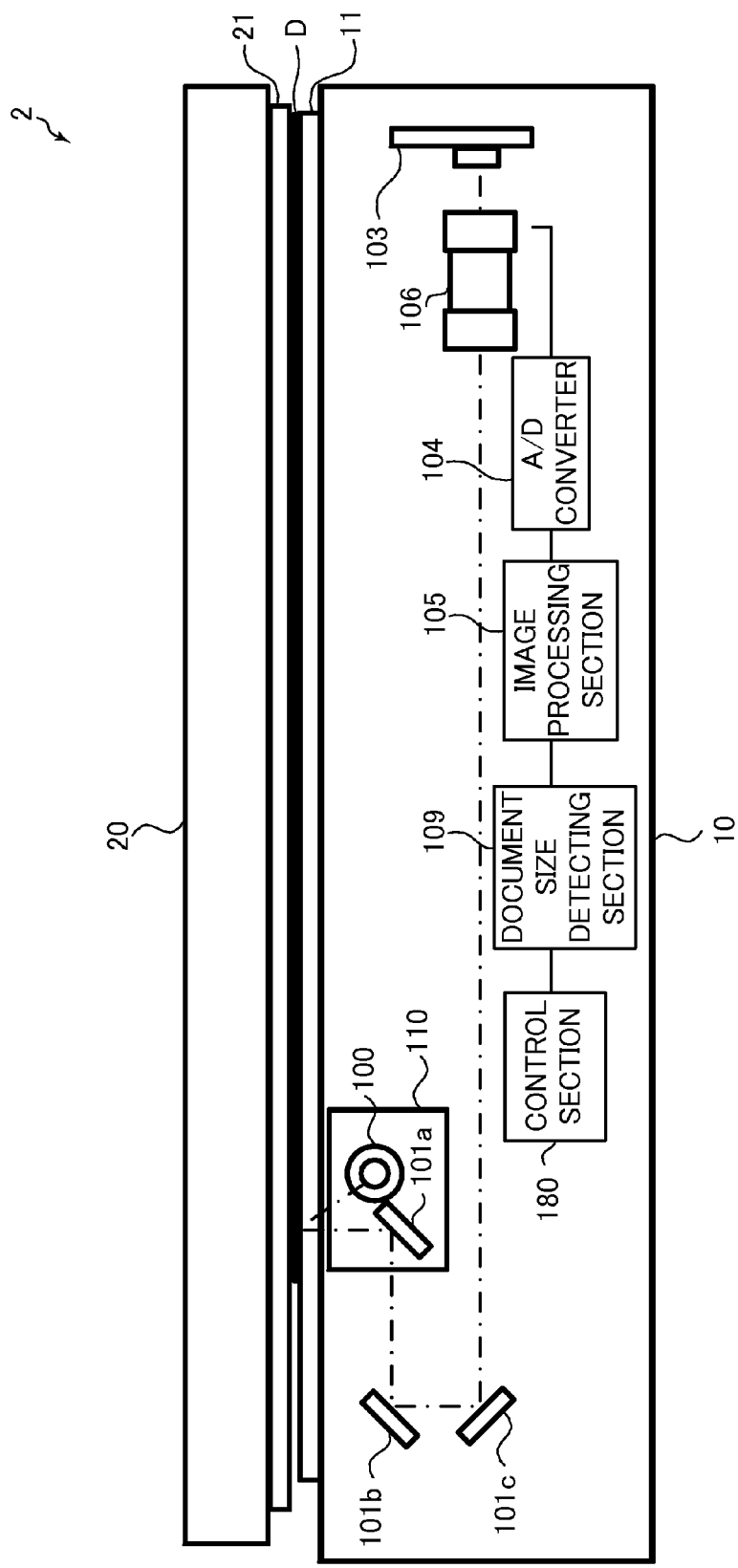
FIG. 3 is a schematic view showing a general configuration of the image reading device.

Next, a description will be given of the structure and configuration of the image reading device 2. FIG. 3 is a schematic view showing a general configuration of the image reading device 2 as viewed from the front side of the image reading device 2 by an operator being in front of the image forming apparatus 1.

The image reading device body 10 is provided with a light source 100, an optical system including three mirrors 101a, 101b, 101c and an optical lens 106, and an image sensor 103. The light source 100 and the mirror 101a are accommodated in a movable carriage 110.

Figure 4A:
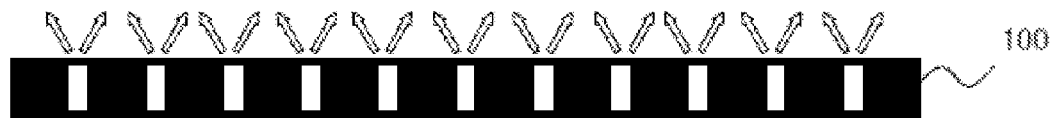
FIG. 4A, FIG. 4B, and FIG. 4C schematically illustrates various lighting states and light intensities of arrayed LEDs.
Figure 4B:
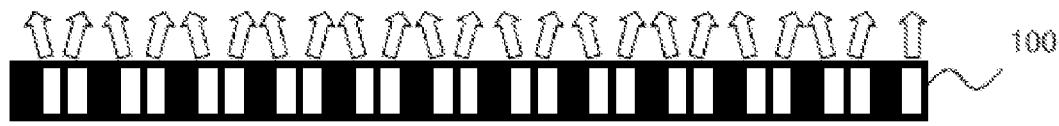
Figure 4C:
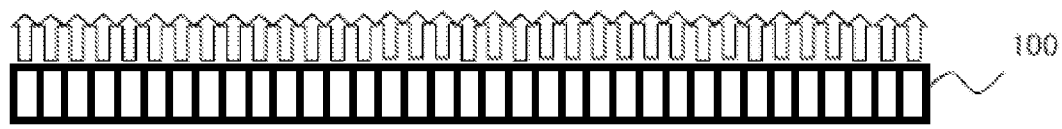

The light source 100 is configured to apply light to an original document D on the original glass plate 11 from under the original glass plate 11. As indicated in FIG. 4A, FIG. 4B, and FIG. 4C, the light source 100 can be composed of, for example, a plurality of arrayed white LEDs as shown in FIG. 4. As indicated in FIG. 4C, the light intensity of the light source 100 reaches the maximum value by lighting all the plurality of arrayed white LEDs. Furthermore, as indicated in FIG. 4B, the light source 100 can provide a light intensity of about one half of the maximum value by lighting every other LED of the arrayed white LEDs. Moreover, as indicated in FIG. 4A, the light source 100 can provide a light intensity of about one third of the maximum value by lighting one in every three white LEDs. In addition, the light intensity of the light source 100 can be controlled by the amount of current supplied to each LED.

The three mirrors 101a, 101b, and 101c are configured to reflect light reflected on the original document D irradiated by light from the light source 100 and guide it to the optical lens 106.

The optical lens 106 forms on the image sensor 103 a reduced optical image of the light incident on the optical lens 106 via the three mirrors 101a, 101b, and 101c.

The image sensor 103 includes a plurality of sensor elements (for example, CCDs) arrayed in a main scanning direction, which is a direction of extension of the image reading device 2 from its back side to its front side, and is configured to convert the reduced optical image formed by the optical lens 106 into an electrical signal.

Each of the light source 100, the mirrors 101a, 101b, 101c, the optical lens 106, and the image sensor 103 described above extends linearly in the main scanning direction, which is the direction of extension of the image forming apparatus 1 and the image reading device 2 from their back side to their front side. By the movement of the movable carriage 110 in a sub-scanning direction caused by a drive force supplied from an unshown motor, the entire region of the original document D in the main scanning direction can be read throughout the dimension thereof in the sub-scanning direction (the direction perpendicular to the main scanning direction) by the light source 100, the mirrors 101a, 101b, 101c, the optical lens 106, and the image sensor 103.

The image reading device 2 further includes an A/D converter 104, an image processing section 105, a document size detecting section 109, and a control section 180.

The A/D converter 104 is configured to convert an electrical signal output from the image sensor 103 to a digital signal. The image processing section 105 is composed of, for example, an ASIC (application specific integrated circuit) or so on and configured to process the digital signal (read data) output from the A/D converter 104 to generate image data of the original document D.

The document size detecting section 109 is configured to use the image data generated by the image processing section 105 to detect the size of the original document D. The document size detecting section 109 detects the size of the original document D immediately before the original cover 20 is closed and while it is still open, specifically in this embodiment, at the time when the control section 180 has detected that the original cover 20 has turned from the "open position" to the "closed position" or at the time when an operator has operated a predetermined button on the operating section 50 (such as a start key operable to start scanning) or has operated a scanning start button displayed on the display 473.

The control section 180 is composed of a CPU, a RAM, and so on and governs the overall operation control of the image reading device 2 and the image forming apparatus 1. Particularly in detecting the size of an original document D with the original cover 20 open, the control section 180 reduces the light intensity of the light source 100 to avoid the operator from being dazzled by intensive light from the light source 100. Specifically, the control section 180 controls the light intensity of the light source 100 by lighting only some of the arrayed LEDs of the light source 100 and controlling the current supplied to the LEDs.

Next, a description will be given of processing for setting the light intensity of the light source executed by the control section 180 in detecting the size of an original document. FIG. 5 is a flowchart showing the processing for setting the light intensity of the light source executed by the control section 180 in detecting the size of an original document.

When the detection of the size of an original document D is started according to, for example, an operator's instruction to start scanning and the control section 180 detects, based on an output from the original cover open/close detection switch 150, that the original cover 20 is in an "open position" (YES in S1), the control section 180 sets the light intensity of the light source 100 at a low light intensity A as a document size detection light intensity at which the light source 100 is to be lit in detecting the size of the original document D (S3).

On the other hand, when the control section 180 detects, based on an output from the original cover open/close detection switch 150, that the original cover 20 is in an "closed position" (NO in S1 and NO in S2), the control section 180 sets the light intensity of the light source 100 at a middle light intensity B as the document size detection light intensity (S4). When the control section 180 detects that the original cover 20 is in an "fully closed position" (NO in S1 and YES in S2), the control section 180 sets the light intensity of the light source 100 at a high light intensity C as the document size detection light intensity (S5). The middle light intensity B is a value higher than the low light intensity A and lower than the high light intensity C. As shown in FIG. 4A, FIG. 4B, and FIG. 4C, the control section 180 lights one third of the arrayed LEDs when having set the light source 100 at the low light intensity A, lights one half of them when having set the light source 100 at the middle light intensity B, and lights all of them when having set the light source 100 at the high light intensity C.

Then, the control section 180 lights the light source 100 at a light intensity set in the above manner and allows the image sensor 103 to read the image of the original document D on the original glass plate 11 for the purpose of detecting the size of the original document D (S6). The sensor output of the image sensor 103 is converted from an analog to digital signal by the A/D converter 104 and the digital signal is subjected to image processing by the image processing section 105, resulting in image data.

The control section 180 allows the movable carriage 110 to move in the sub-scanning direction from a predetermined home position to an end of the original document D located on the home position side and, at this position, lights the light source 100 and allows the image sensor 103 to start image reading. In this relation, the control section 180 allows the image reading device 2 to perform image reading, as for the main scanning direction, over a range exceeding the width equal in the main scanning direction to the maximum sheet size placeable on the original glass plate 11. On the other hand, because an image necessary to detect the size of the original document D only has to be acquired, the movable carriage 110 need not be moved over the entire dimension of the original document D in the sub-scanning direction but is moved only over part of the dimension of the original document D in the sub-scanning direction, for example, over a distance of about 2 cm from an end of the original document D in the sub-scanning direction. An image portion located over the movable carriage 110 is read during the movement of the movable carriage 110.

Subsequently, the document size detecting section 109 uses the image data generated by the image processing of the image processing section 105 to execute processing for detecting the original document D placed on the original glass plate 11 in terms of the size in the main scanning direction (S7).

More specifically, the document size detecting section 109 detects the width of a region in the main scanning direction which is composed of a row of pixels arranged in the main scanning direction and each having a pixel value indicating the incidence of reflected light from the original document D. The document size detecting section 109 detects the detected width of the region in the main scanning direction as the size of the original document D in the main scanning direction.

The document size detecting section 109 previously stores a plurality of existing sheet sizes (A4, B5, letter size, and other sizes) each represented by a combination of length and width. The document size detecting section 109 extracts the sheet size identical in length or width with the detected size in the main scanning direction from among the stored sheet sizes (S8).

If at this time the number of extracted sheet sizes is singular (YES in S9), the document size detecting section 109 detects the extracted sheet size (one of A4, B5, letter size, and other sizes) as the size of the original document D (S10).

If the number of extracted sheet sizes is plural (NO in S9), the control section 180 allows the display 473 to display images representing the extracted sheet sizes (S11). Then, the operator touches, on the display screen of the display 473 where the images representing the extracted sheet sizes are displayed, an image representing the sheet size corresponding to the size of the original document D placed on the original glass plate 11. Thus, using the touch panel function of the display 473, the sheet size represented by the touched image is accepted as the size of the original document D by the document size detecting section 109 (S12). In this manner, the size of the original document D placed on the original glass plate 11 can be detected.

Figure 6:
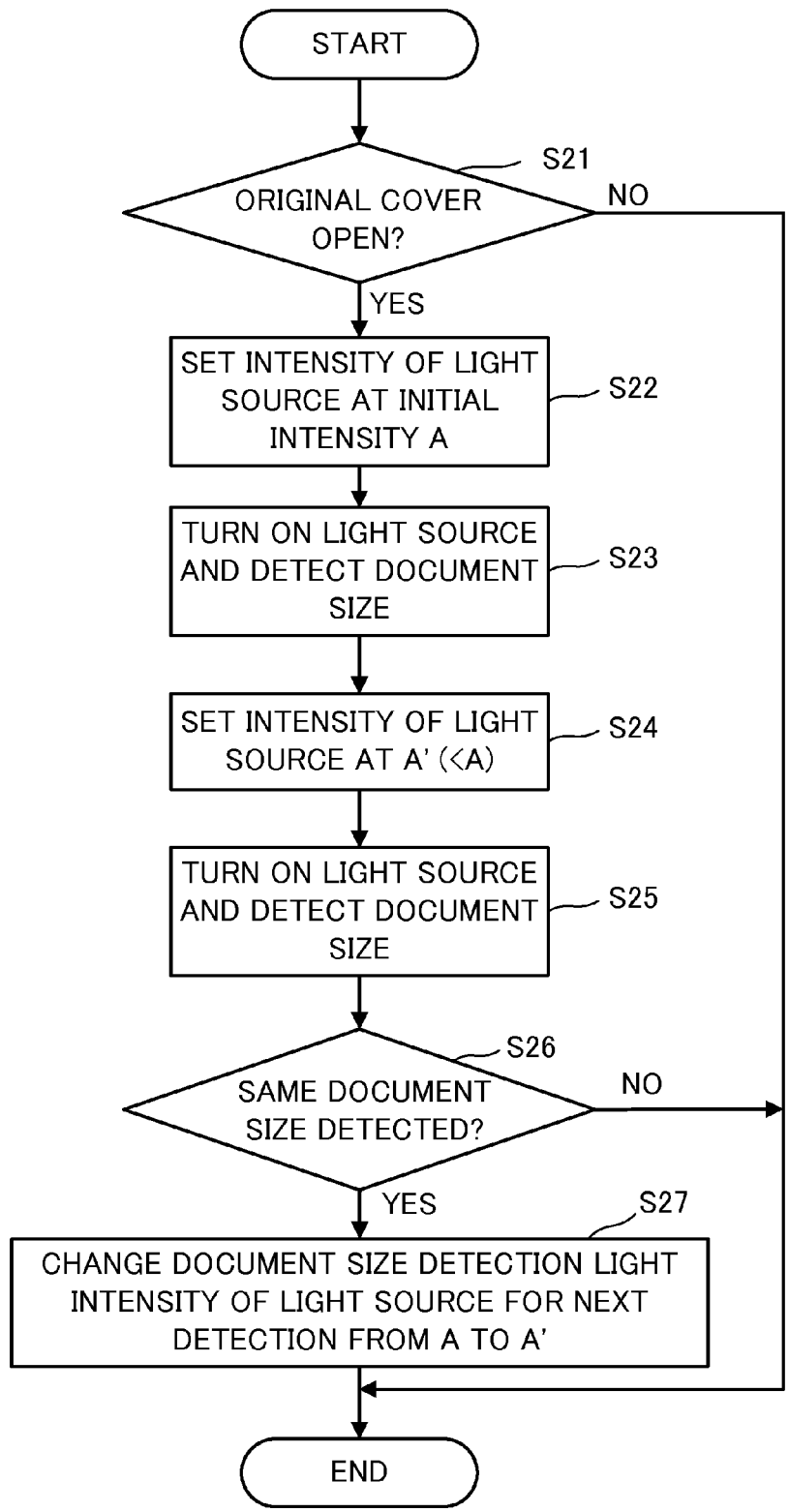
FIG. 6 is a flowchart showing processing for controlling the light intensity of the light source executed by a control section when detecting the size of an original document for the first time.

Next, a description will be given of processing for controlling the light intensity of the light source executed by the control section 180 when detecting the size of an original document for the first time. FIG. 6 is a flowchart showing the processing for controlling the light intensity of the light source executed by the control section 180 when detecting the size of an original document for the first time.

When the detection of the size of an original document D is started according to, for example, an operator's instruction to start scanning and the control section 180 detects, based on an output from the original cover open/close detection switch 150, that the original cover 20 is in an "open position" (YES in S21), the control section 180 sets the light intensity of the light source 100 at an initial light intensity A (S22). The initial light intensity A is the above-described low light intensity A. Then, the control section 180 lights the light source 100 at the initial light intensity A and allows the document size detecting section 109 to detect the size of the original document D (S23).

Next, the control section 180 sets the light intensity of the light source 100 at a light intensity A' (S24). The light intensity A' is a lower light intensity reduced by a predetermined value from the low light intensity A. The control section 180 performs this light intensity control by reducing the current to be supplied to each LED. Then, the control section 180 lights the light source 100 at the light intensity A' and allows the document size detecting section 109 to detect the size of the original document D again (S25).

When the above two detections of the size of the original document D are completed, the control section 180 determines whether or not the same size has been detected as the size of the original document D in the above two detections. If the same size has been detected as the size of the original document D in the two detections (YES in S26), the control section 180 changes the document size detection light intensity at which the light source 100 is to be lit in detecting the size of an original document next time from the light intensity A to A' (S27). The reason for this is that even if the document size detection light intensity is reduced to A', the size of an original document can be correctly detected. On the other hand, if different sizes have been detected as the size of the original document D in the two detections (NO in S26), the control section 180 keeps the document size detection light intensity of the light source 100 unchanged at the initial light intensity A. The reason for this is that if the initial light intensity is changed to A', the size of an original document may not be able to be correctly detected.

When in step S27 the document size detection light intensity of the light source 100 is changed from A to A', the next detection of the size of an original document is performed by lighting the light source 100 at the light intensity A' lower than the low light intensity A. Thus, while the accuracy of correctly detecting the sizes of original documents D of different thicknesses can be ensured, intensive light during the detection of the size of each original document D can be kept from entering operator's eyes, thereby reducing the operator's discomfort.

When the detection of the size of an original document is performed with the original cover 20 open, disturbance light enters the image reading device 2. For this reason, the determination in step S26 of whether or not the same size has been detected as the size of an original document D depends upon the surrounding environment at the moment. Therefore, after the document size detection light intensity of the light source 100 is changed to A' in step S27, it is necessary to verify whether the size of an original document D can be correctly detected at the light intensity.

Next, a description will be given of processing for controlling the low light intensity of the light source executed by the control section 180 when detecting the size of an original document for the second and subsequent times. FIG. 7 is a flowchart showing the processing for controlling the light intensity of the light source executed by the control section 180 when detecting the size of an original document for the second and subsequent times.

When the detection of the size of an original document D is started according to, for example, an operator's instruction to start scanning and the control section 180 detects, based on an output from the original cover open/close detection switch 150, that the original cover 20 is in an "open position" (YES in S31), the control section 180 sets the document size detection light intensity of the light source 100 at A' (S32). Then, the control section 180 lights the light source 100 at the light intensity A' and allows the document size detecting section 109 to detect the size of the original document D (S33).

In the case where, as just described, the document size detection light intensity is the low light intensity A', the control section 180 increases the light intensity of the light source 100 by a predetermined amount α to change it to A'+α (S34). For example, the amount of increase α is so slight that the difference from the original amount is imperceptible to human eyes and A'+α is a light intensity lower than the initial light intensity A. Then, the control section 180 lights the light source 100 at the light intensity A'+α and allows the document size detecting section 109 to detect the size of the original document D again (S35).

When the above two detections of the size of the original document D are completed, the control section 180 determines whether or not the same size has been detected as the size of the original document D in the two detections. If different sizes have been detected as the size of the original document D in the two detections (NO in S36), the control section 180 returns the document size detection light intensity at which the light source 100 is to be lit in detecting the size of an original document next time from the light intensity A' to the initial light intensity A (S37). The reason for this is that if the initial light intensity is kept unchanged at A', the size of an original document may not be able to be correctly detected.

When in step S37 the control section 180 returns the initial light intensity of the light source 100 to the default value A, the next detection of the size of an original document is performed by lighting the light source 100 at the initial light intensity A. As can be seen, if, after the change of the document size detection light intensity of the light source 100 to A' in step S27 shown in FIG. 5, the size of an original document D may be less likely to be correctly detected at the light intensity, the document size detection light intensity of the light source 100 is returned to the default light intensity A. This makes it possible again to correctly detect the size of an original document.

On the other hand, if the same size has been detected as the size of the original document D in the two detections (YES in S36), the control section 180 keeps the document size detection light intensity of the light source 100 unchanged at A'. The reason for this is that since the size of an original document can be correctly detected even when the document size detection light intensity is kept at A', the lower light intensity A' is preferable as the document size detection light intensity to the light intensity A from the viewpoint of keeping intensive light from entering operator's eyes during the detection of the size of the original document.

The above light intensity returning processing from step S31 to step S37 may be executed a predetermined period after the document size detection light intensity of the light source 100 is set at A', for example, one or more days after the document size detection light intensity is set at A'.

Specifically, if the document size detection light intensity of the light source 100 is set at A', the control section 180 may keep the document size detection light intensity of the light source 100 at A' during the same day and execute the light intensity returning processing of returning the document size detection light intensity of the light source 100 to the default light intensity A according to the steps S31 to S37 the next day. Thus, by avoiding the execution of the above light intensity returning processing during a period when the probability of occurrence of a change in surrounding environment is low, whether or not to return the document size detection light intensity to the default light intensity A can be efficiently determined, the accuracy of detecting the size of an original document with the original cover 20 open can be ensured, and, simultaneously, intensive light during the detection of the size of the original document D can be kept from entering operator's eyes, thus reducing the operator's discomfort.

As thus far described, this embodiment makes it possible to reduce the light intensity of the light source 100 in detecting the size of an original document with the original cover 20 open, while maintaining the accuracy of detecting the size of the original document. Furthermore, this embodiment makes it possible to correctly detect the sizes of original documents D of different thicknesses and keep intensive light during the detection of the size of each original document D from entering operator's eyes, thereby reducing the operator's discomfort.

In detecting the size of an original document with the original cover 20 open, for example, a simple setting of the light source at a low light intensity means to treat the light intensity as a fixed value and, therefore, may fail to achieve correct detection of the size of the original document because the light intensity is relatively too low depending upon the thickness of the original document. On the other hand, if the fixed value is set to be relatively high in detecting the size of an original document with the original cover 20 open, this may cause still intensive light to enter operator's eyes during the detection of the size of the original document to dazzle the operator. In contrast, in this embodiment, the light intensity of the light source 100 in detecting the size of an original document with the original cover 20 open can be reduced enough to decrease the operator's discomfort while the accuracy of detecting the size of the original document is maintained.

The present disclosure is not limited to the above embodiment and can be modified in various ways. For example, the above embodiment has been described taking as an example the case where the original cover 20 is a platen cover. However, in an image forming apparatus 1 in which an ADF (auto sheet feeder) is provided in an upper portion thereof and the underside of the ADF constitutes a document holder configured to hold down an original document placed on the original glass plate 11, the ADF, particularly, its document holder functions as the original cover 20. In other words, not only the above original cover 20 but also the ADF are examples of the original cover defined in "What is claimed is".

For another example, although in the above embodiment the image reading device 2 is an optical reduction system image reading device in which a CCD is used, the present disclosure can also be applied to an equi-magnification optical system image reading device in which an original document D is read using an erect equi-magnification optical system, such as a Selfoc® lens, to form an optical image of the original document D on a CIS (contact image sensor).

The structure, configuration, and processing shown in the above embodiment with reference to FIGS. 1 to 7 are merely illustrative of the present disclosure and the present disclosure is not intended to be limited to the above structure, configuration, and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image reading device comprising:
an original glass plate for use with an original document placed on a top surface thereof;
an original cover pivotally mounted at one edge thereof and capable of surface contact with the original glass plate;
an image reading section configured to read the original document to acquire image data of the original document and including a light source capable of irradiating the original document with light from under the original glass plate, an optical system configured to form an optical image of reflected light from the original document irradiated by the light from the light source, and an image sensor configured to convert the optical image formed by the optical system into an electrical signal;
a document size detecting section configured to use the image data acquired by the image reading section with the original cover open to detect a size of the original document in a main scanning direction of the image reading section; and
a control section configured to allow the document size detecting section to perform a detection of the size of the original document by lighting the light source at an initial light intensity, subsequently allow the document size detecting section to perform another detection of the size of the original document by lighting the light source at a light intensity reduced by a predetermined value from the initial light intensity, and set, when the same size has been detected in the two detections of the size of the original document, the reduced intensity as a document size detection light intensity at which the light source is to be lit in detecting the size of an original document next time,
wherein the control section is further configured to allow the document size detecting section to perform a detection of the size of the original document by lighting the light source at the reduced light intensity, subsequently allow the document size detecting section to perform another detection of the size of the original document by lighting the light source at a light intensity increased by a predetermined value from the reduced intensity, and execute, when different sizes have been detected as the size of the original document, light intensity returning processing for returning the document size detection light intensity to the initial light intensity,
the control section is further configured to when having set the reduced light intensity as the document size detection light intensity, maintain the document size detection light intensity at the reduced light intensity during a predetermined period and then execute the light intensity returning processing after the passage of the predetermined period,
the image reading device further comprises an original cover open/close detecting section configured to detect whether the original cover is open or closed,
the control section is further configured to detect, based on an output from the original cover open/close detecting section, an open position where the original cover is open, a closed position where the original cover is somewhere in between the open position and a fully closed position where the original cover comes into surface contact with the original glass plate and is fully closed, or the fully closed position,
the control section is further configured to set the initial light intensity at a predetermined light intensity A upon detection of the open position, set the initial light intensity at a predetermined light intensity B higher than the light intensity A upon detection of the closed position, and set the initial light intensity at a predetermined light intensity C still higher than the light intensity B upon detection of the fully closed position, and
the control section is further configured to execute the light intensity returning processing when having set the initial light intensity at the light intensity A.

2. The image reading device according to claim 1, wherein
the light source is an array of LEDs,
the light intensity A is a light intensity when one third of the array of LEDs become lit at equal intervals,
the light intensity B is a light intensity when one half of the array of LEDs become lit at equal intervals, and
the light intensity C is a light intensity when all the array of LEDs become lit.

3. The image reading device according to claim 2, wherein the reduced light intensity is a light intensity obtained by reducing an amount of current of the LEDs being lit at the light intensity A by a predetermined amount.

4. An image forming apparatus comprising:
the image reading device according to claim 1; and
an image forming section configured to form an image using the optical image of the original document read by the image reading device.

* * * * *